United States Patent [19]

Forsberg

[11] Patent Number: 4,504,262
[45] Date of Patent: Mar. 12, 1985

[54] DECANTER CENTRIFUGE

[75] Inventor: Bjorn Forsberg, Horsholm, Denmark

[73] Assignee: Alfa-Laval Separation A/S, Søborg, Denmark

[21] Appl. No.: 542,170

[22] Filed: Oct. 14, 1983

[30] Foreign Application Priority Data

Oct. 21, 1982 [DK] Denmark .............................. 4670/82

[51] Int. Cl.³ ............................................... B04B 1/20
[52] U.S. Cl. ........................................ 494/53; 494/83; 494/84
[58] Field of Search .............................. 248/637, 666; 308/184 R; 384/218; 494/51, 52, 53, 54, 82, 83, 84

[56] References Cited

U.S. PATENT DOCUMENTS

| | | | |
|---|---|---|---|
| 1,210,085 | 12/1916 | LeBlanc | 384/218 |
| 2,867,378 | 1/1959 | Harlow | 494/84 |
| 3,971,509 | 7/1976 | Johnson | 494/60 |
| 4,299,353 | 11/1981 | Bruning et al. | |
| 4,332,350 | 6/1982 | McClellan | 494/84 |
| 4,350,104 | 9/1982 | Cook | 248/666 |

FOREIGN PATENT DOCUMENTS 260315  5/1912  Fed. Rep. of Germany .
2730105  2/1978  Fed. Rep. of Germany .

Primary Examiner—Robert W. Jenkins
Assistant Examiner—Arthur D. Dahlberg
Attorney, Agent, or Firm—Bernard, Rothwell & Brown

[57]  ABSTRACT

At each end the bowl of the centrifuge is journalled for rotation in a bearing housing from which the prevailing bearing loads are transmitted to a support means through a system of springs, the spring rate of which is so low that the natural frequency of the centrifuge is substantially below its normal rpm, preferably lower than 15 percent thereof. The bowl can then rotate at a high rate of rotation without concomitant vibration problems.

In order to avoid undesirable transverse forces acting on the bowl a pulley mounted on its protruding shaft end may be pre-loaded in diametrically opposed directions by means of two pretensioned belt drives each of which is trained over a stationarily mounted pulley. At least one of the last mentioned pulleys is driven by a motor.

7 Claims, 6 Drawing Figures

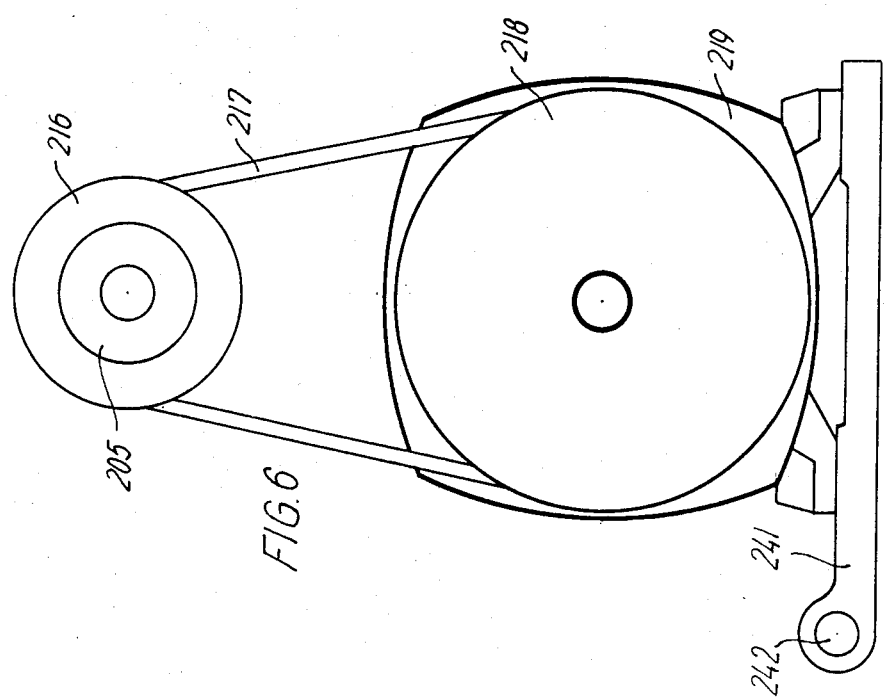
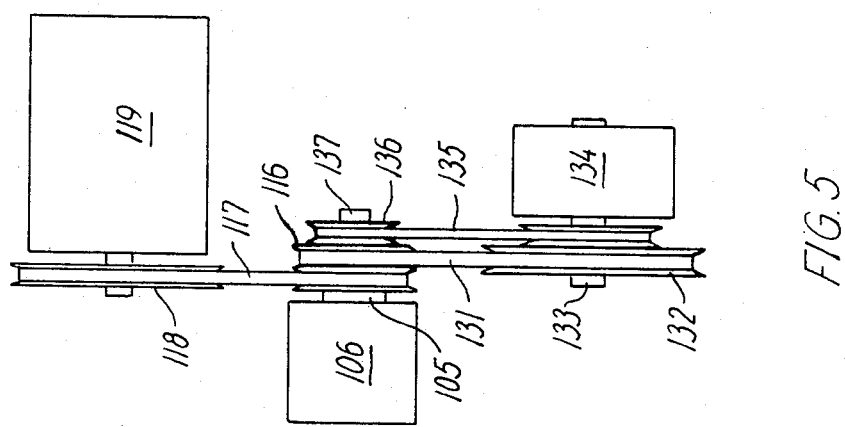

DECANTER CENTRIFUGE

BACKGROUND OF THE INVENTION

This invention relates to a decanter centrifuge, comprising an elongate bowl, a bearing at each end of the bowl supporting the bowl for rotation about its longitudinal axis, a stationary support means for supporting each bearing, a conveyor screw located within the bowl and journalled for rotation about the axis of the bowl, drive means for rotating the bowl, and differential drive means for causing the conveyor screw to rotate relative to the bowl.

As well-known in the art, a decanter centrifuge is employed for separating a raw material supplied to the interior of the bowl into a solids phase and one or more liquid phases which are withdrawn from the bowl through separate outlets. As a consequence of the rotation of the conveyor screw relative to the wall of the bowl the solids phase is conveyed along a conical part of the bowl wall towards an outlet at one end of the bowl. In known decanter centrifuges the permissible rpm of the bowl, which determines the capacity of the centrifuge, is limited by the dynamic bearing loads resulting from unavoidable unbalance of the rotating components. In practice this circumstance implies that the bearings and the support means of the centrifuge have to be made so stiff that the first critical vibration frequency of the centrifuge is about 50 percent higher than its nominal rpm or rate of revolution.

SUMMARY OF THE INVENTION

It is an object of the present invention to provide a decanter centrifuge which can be operated at higher rpm resulting in an increased capacity or throughput with given dimensions of the centrifuge.

According to the invention a decanter centrifuge of the kind referred to above is characterized in that a load-transferring spring system is interposed between each bearing and its associated support means, each of said spring systems having a spring rate which is so low that the resiliently supported centrifuge has a natural vibration frequency considerably lower than its nominal rpm.

Because the previously used stiff mounting of the bowl on the support means has been replaced by a soft mounting whereby in operation the axis of rotation of the bowl automatically adjusts itself so as to coincide with a longitudinal axis extending through the centre of gravity, the requirement for balancing of the rotating components is considerably less severe. The stiffness of the bowl bearings and of the support means, which in the prior art structures has to be high, is now of secondary importance. The soft mounting ensures that vibration inducing forces will not be transferred from the centrifuge to the support means. The requirement for a very exact mutual alignment of the two bearings has been eliminated. It has been found that the invention permits to increase the rpm of the bowl by more than 20 percent whereby the centrifugal force acting on the material being processed increased by about 50 percent.

The spring systems are preferably dimensioned such that the natural frequency of the centrifuge is between 5 and 15 percent of its nominal rpm. When, during start or stopping of the centrifuge, the bowl momentarily rotates at the corresponding critical rate of revolution, the dynamic bearing loads are then correspondingly low so that the transitory deflections of the bowl ends occurring at the passage of the critical rpm do not present any problems.

The soft support of the bowl ends makes it desirable that the driving torque be transmitted to the bowl as far as possible without any accompanying transverse force acting on the bowl.

It would be possible to obtain this effect by means of a cardan shaft connecting the bowl with the drive motor of the centrifuge, but a simpler and more reliable solution of the problem is provided by an embodiment of the invention which is characterized in that the drive means comprises a motor, a pulley secured to the motor shaft, a pulley secured to the bowl, and a pre-tensioned belt drive trained over the motor and bowl pulleys, and that each spring system is dimensioned such that with the bowl at rest the resultant of all forces acting on each bearing, including the tension prevailing in the belt drive, maintains the axis of that bearing in a central position relative to the associated support means.

During rotation of the bowl the tension in the driving strand of the belt increases, but since the tension in the non-driving strand decreases by substantially the same amount, the total force exerted on the bowl by the belt remains unchanged and, consequently, the equilibrium of the forces prevailing at rest is maintained also in operation, without any deleterious shifting of the bearing axes relative to the stationary support means.

The desired equilibrium or balancing of the forces may be obtained in various ways. In one embodiment the drive means comprises two motors located substantially diametrically opposed relative to the bowl axis with their axes extending in parallel to the bowl axis, and a belt drive connecting each motor pulley with a pulley secured to the bowl. In this embodiment the unwanted transverse force on the bowl is eliminated due to the fact that the oppositely directed pre-tensions in the two belt drives cancel out, entirely or substantially, while at the same time there is obtained a high operating reliability by means of a conventional belt drive.

In another embodiment of the invention the drive means comprises one motor located below the bowl and secured to a support plate freely pivotable about a horizontal axis, and a belt drive connecting the motor pulley with a pulley secured to the bowl. In this embodiment the bowl is always, whether at rest or rotating, subjected to a constant force exerted through the belt drive and determined by the combined weight of the motor and the motor support plate.

A further embodiment of the invention is characterized in that the drive means comprises one motor and a first pre-tensioned belt drive connecting the motor pulley with a pulley secured to the bowl, and the differential drive means comprises an epicyclic gear operatively connecting the bowl and the conveyor screw and having an input sunwheel shaft, an idler pulley supported for rotation about an axis parallel to the bowl axis by external bearing means located opposite the motor, a second pre-tensioned belt drive connecting the idler pulley with a pulley secured to the bowl, and a third belt drive connecting the idler pulley with the input sunwheel shaft. In this embodiment the oppositely directed forces in the first and second belt drives cancel out so that no transverse force acts on the bowl while the combination of the second and third belt drives constitutes a convenient means for driving the input shaft of the epicyclic gear.

BRIEF DESCRIPTION OF THE DRAWINGS

The invention will now be described in more detail with reference to the accompanying drawings, in which FIG. 5 is a schematic lateral view of a modified embodiment of the drive means for rotating the centrifuge bowl, and FIG. 6 is a schematic end view of a further modified embodiment of the drive means.

DETAILED DESCRIPTION

Figure 1:
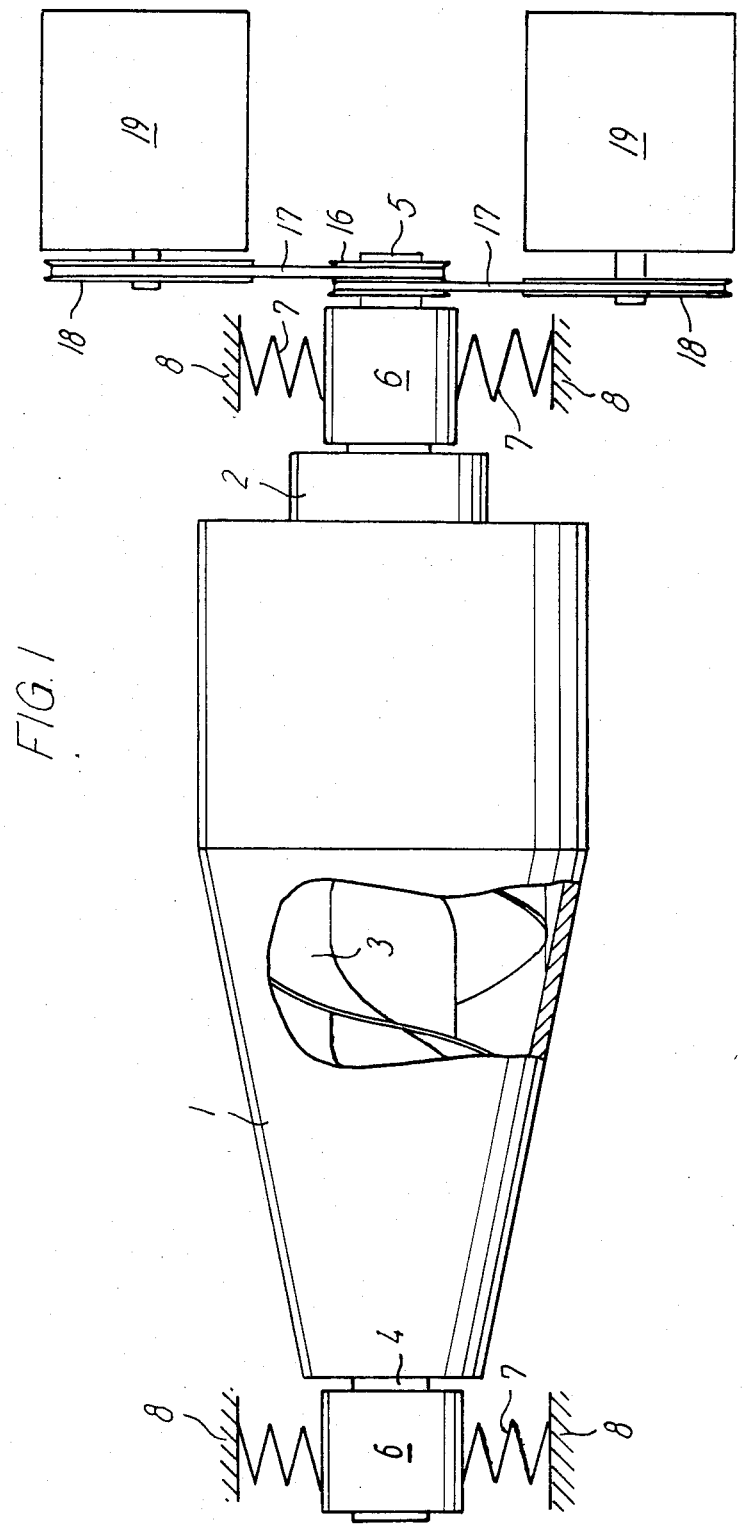
FIG. 1 is a schematic lateral view of a decanter centrifuge embodying the invention, with its associated support and drive means seen from the outside, and with the bowl partly sectioned to show the internal conveyor screw.

FIG. 1 shows the bowl 1 of the decanter centrifuge which, through a differential gear 2, such as an epicyclic gear, at the right-hand end of the bowl, is coupled to the internal conveyor screw 3. The general structure of the centrifuge as such will not be described in detail, since it is well known in the art, inter alia from the specification of U.S. Pat. No. 3,971,509 issued July 27, 1976 to Frank B. Johnsen, which is herewith incorporated by reference. By means of protruding stub shafts 4 and 5 the bowl is journalled in two bearing housings 6, one of which has been shown in more detail in FIGS. 3 and 4. By means of springs 7, which in FIG. 1 are shown schematically, each bearing housing is supported on a stationary frame, which in FIG. 1 has been indicated quite schematically at 8. The spring systems are shown in more detail in FIGS. 2 and 3.

Figure 2:
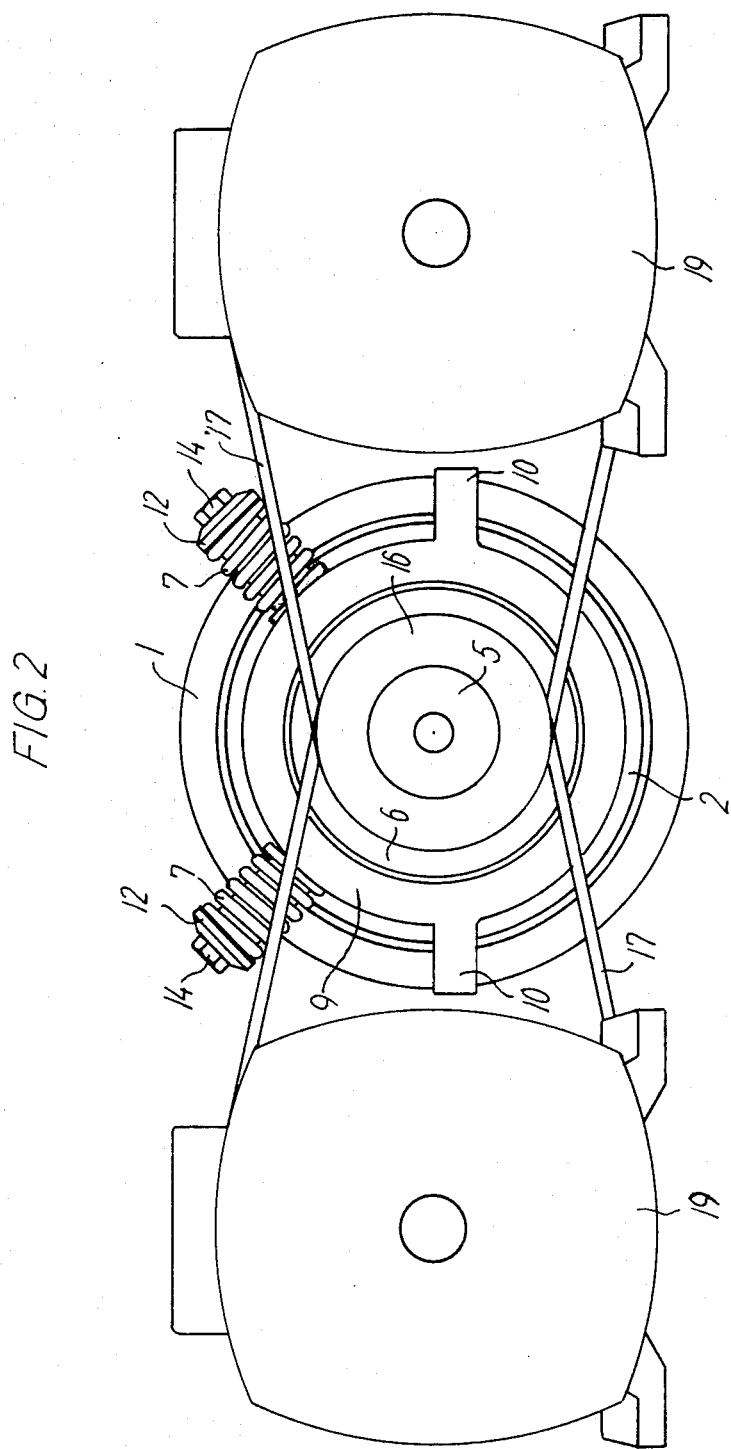
FIG. 2 is a view of the centrifuge and the drive means seen from the right-hand end of FIG. 1, in more detail and on an enlarged scale.
Figure 3:
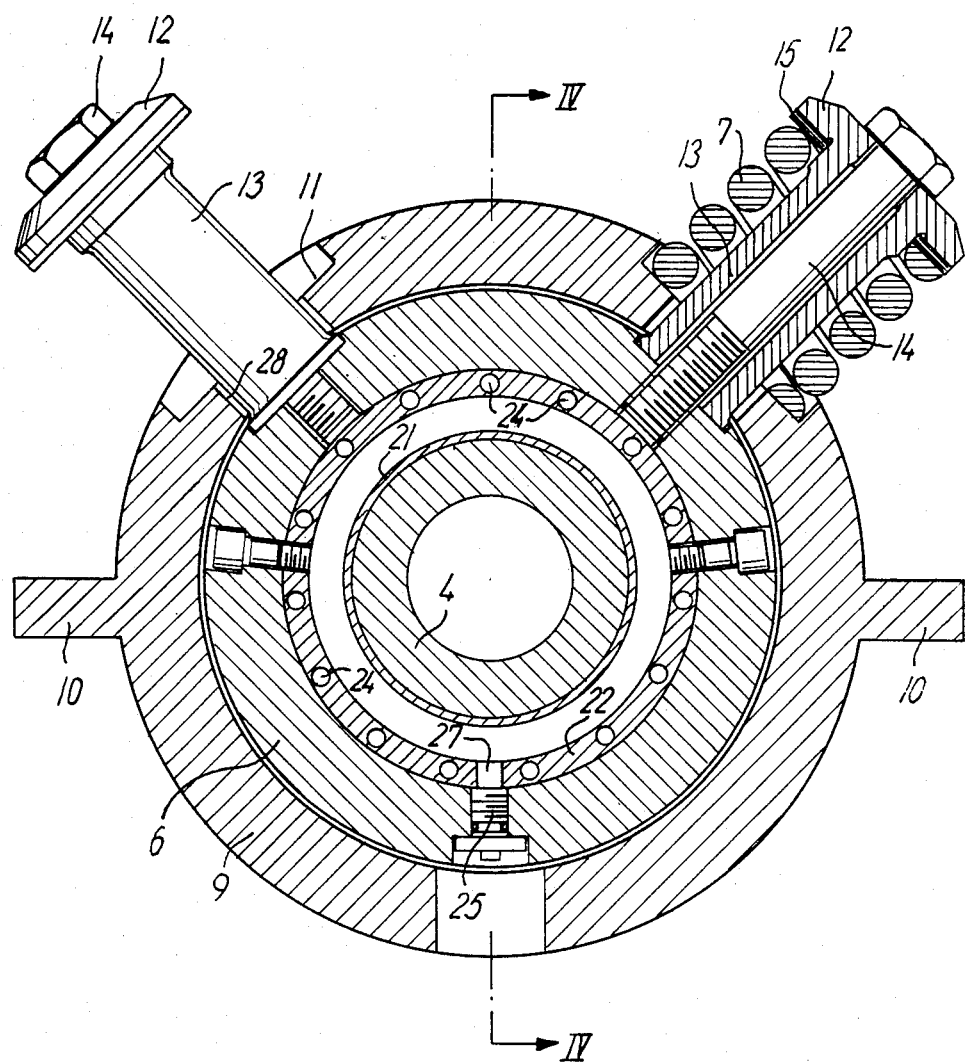
FIG. 3 is a cross-sectional view, on a further enlarged scale, of the bearing arrangement at the left-hand end of the centrifuge.

Each bearing housing 6 is surrounded, with a suitable radial clearance, by a supporting ring 9 which by means of protruding flanges 10 is bolted to the associated frame, which has been omitted in FIGS. 2 and 3 for the sake of clarity. Each of the springs 7, of which only one has been shown in FIG. 3, is mounted, with a suitable pre-compression, between a recess 11 in the peripheral surface of ring 9 and a flange 12 integral with a sleeve 13 which in turn is clamped to bearing housing 6 by means of a threaded bolt 14. The pre-compression of each spring 7 may be adjusted by inserting a larger or smaller number of washers, indicated at 15 in FIG. 3, between flange 12 and the outer end face of the spring.

A pulley 16 having two V-belt grooves is secured to stub shaft 5 and through each of two V-belts 17 pulley 16 is drivingly coupled to an external V-belt pulley 18 secured to the output shaft of a drive motor 19 bolted to the frame (not shown). As shown in FIG. 2 the motors 19 are located at opposite sides of the bowl with their axes located diametrically opposed relative to the bowl axis.

Figure 4:
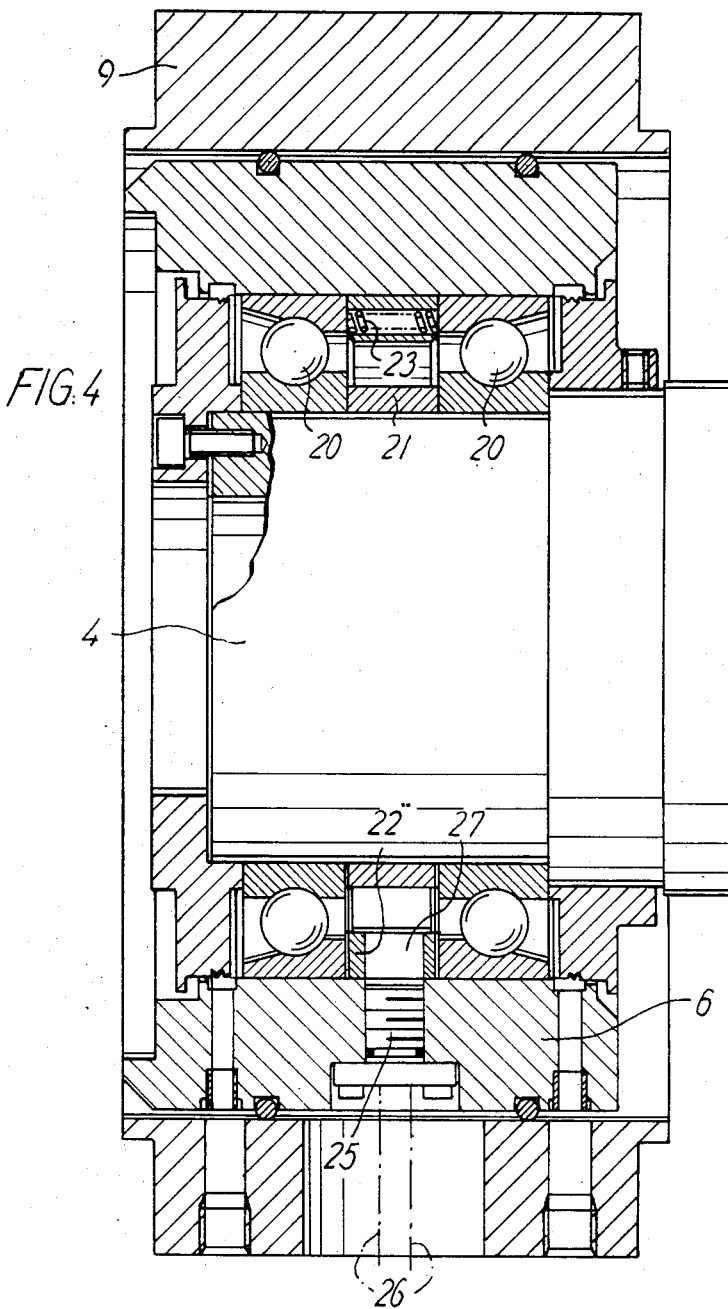
FIG. 4 is a section along line IV—IV of FIG. 3, and on a still larger scale.

FIGS. 3 and 4 illustrate an embodiment of the bearing means for the stub shaft 4. The bearing means (not shown) for the other stub shaft 5 can be of similar construction. The stub shaft is supported in two pre-loaded spindle bearings 20 mounted with interposed inner and outer spacer rings 21 and 22. A plurality of compression springs 23, one of which is seen in FIG. 4, for providing the pre-load of bearings 20 are mounted in bores 24 in ring 22. A sleeve 25 for supplying lubricant to the bearings is screwed tightly into bearing housing 6. For lubricating the bearings 20 there may be provided a known oil-air lubrication system, which operates by continually injecting an air stream, to which small metered amounts of oil are periodically added, through two pipes, indicated by dot-and-dash lines 26 in FIG. 4, which extend through sleeve 25 and an aperture 27 in ring 22 and which terminate in nozzle-like apertures, each directed towards one bearing 20.

The maximum tangential deflection of bearing housing 6 relative to supporting ring 9 is determined by the clearance between sleeves 13 and the associated apertures 28 in bearing ring 9, see FIG. 3.

As mentioned above it is not mandatory that both external pulleys 18 are motor-driven, the main thing only being that oppositely directed pre-load forces are exerted on the main shaft of the bowl through the two belt drives 17. When two drive motors are provided, as shown in FIGS. 1 and 2, one motor may alternatively serve only for starting the centrifuge while the other motor functions as the drive motor during operation when the power consumption is reduced. That motor, which in either situation is inoperative, is then running idle driven from the bowl. In connection with a special starter motor there may be provided a built-in liquid coupling. In an alternative embodiment (not shown) each of the external pulleys may be secured to an intermediate shaft driven from a common motor.

FIG. 5 illustrates a modified embodiment of the drive means for the centrifuge. Since the centrifuge as such, including its bearing means and the associated spring systems, may be identical with that described above with reference to FIGS. 1 to 4, only the drive means for rotating the bowl and the input sunwheel shaft of the epicyclic gear has been shown in FIG. 5.

In FIG. 5 there is seen one bearing housing 106, in which the hollow stub shaft 105 of the bowl (not shown) is journalled. To shaft 105 is secured a pulley 116 having two grooves, in which engage V-belts 117 and 131, respectively. Through V-belt 117 stub shaft 105, and hence the bowl, is coupled to a pulley 118 secured to the output shaft of a motor 119 bolted to a stationary frame (not shown). In this embodiment motor 119 constitutes the sole drive motor for the centrifuge.

Through the other V-belt 131 stub shaft 105 is coupled to an idler pulley 132 secured to a layshaft 133 journalled for rotation in a bearing block 134 secured to the frame (not shown) of the centrifuge. A third V-belt 135 couples pulley 132 to a pulley 136 secured to a shaft 137 which protrudes coaxially through the hollow stub shaft 105 and which constitutes the input sunwheel shaft of the epicyclic gear (not shown), through which the internal conveyor screw is driven at a rate of revolution slightly different from that of the bowl.

FIG. 6 shows a third embodiment of the drive means for the bowl, which includes a single pre-tensioned belt drive, illustrated by a belt 217 trained over a pulley 216 secured to the stub shaft 205 of the centrifuge bowl (not shown) and over a pulley 218 secured to the output shaft of a drive motor 219. Motor 219 is bolted to a support plate 241 with its center of gravity located substantially vertically below the axis of the bowl, and plate 241 is connected to the frame (not shown) of the centrifuge by means of a horizontal pivot pin 242.

In this embodiment the combined weight of motor 219 and its support plate 241 exerts, through belt drive 217, a downwardly directed force on the bowl of the centrifuge. It will be seen that because plate 241 is freely pivotable on pin 242 said force is constant independent of possible alterations of the belt length.

The spring systems associated with the end bearings of the bowl, which are not shown in FIG. 6 but which may be constructed in like manner as those illustrated in FIGS. 1 to 4, will then be dimensioned and adjusted such as to ensure an equilibrium condition between the spring forces and the weights of the centrifuge and of the drive means, whereby the axis of each bearing is maintained in a central position relative to the associated support means, as illustrated in FIGS. 2 to 4 when the bowl is at rest.

It will be understood that in the embodiments illustrated in FIGS. 1 to 4 and in FIG. 5 where the drive means exert no transverse forces on the bowl, only the weight of the rotating parts of the centrifuge have to be considered in dimensioning the spring systems associated with the bearings.

Although not shown in the drawings it will also be understood that for preventing damage to the components of the centrifuge, suitable means, such as resilient pads, may be provided for limiting the radial movement of the bowl relative to the bearings resulting from a belt failure which disturbs the normally prevailing equilibrium condition. It will furthermore be understood that although the drive means has been described and shown as including single V-belts, any suitable type of belt drives may be employed, including flat belt and multi V-belt drives.

I claim:

1. A decanter centrifuge comprising an elongate bowl, a bearing at each end of the bowl supporting the bowl for rotation about its longitudinal axis, a stationary support means for supporting each bearing, a conveyor screw located within the bowl and journalled for rotation about the axis of the bowl, drive means for rotating the bowl, differential drive means for causing the conveyor screw to rotate relative to the bowl, a load-transferring spring system interposed between each bearing and its associated support means, and each of said spring systems having a spring rate which is so low that the resiliently supported centrifuge has a natural vibration frequency considerably lower than its nominal rpm and that rotation at the natural vibration frequency during starting and stopping occurs at a low rpm where transitory deflections of the bowl ends do not present any problems.

2. A decanter centrifuge as claimed in claim 1, wherein the spring systems are dimensioned such that the natural frequency of the centrifuge is between 5 percent and 15 percent of its nominal rpm.

3. A decanter centrifuge as claimed in claim 1, wherein the drive means comprises a motor, a pulley secured to the motor shaft, a pulley fixedly secured to the bowl, and a pre-tensioned belt drive trained over the motor and bowl pulleys, and wherein each spring system is dimensioned such that with the bowl at rest the resultant of all forces acting on each bearing, including the tension prevailing in the belt drive, maintains the axis of that bearing in a central position relative to the associated support means.

4. A decanter centrifuge as claimed in claim 3, wherein the drie means comprises two motors located substantially diametrically opposed relative to the bowl axis with their axes extending in parallel to the bowl axis, and a belt drive connecting each motor pulley with a pulley fixedly secured to the bowl.

5. A decanter centrifuge as claimed in claim 4, wherein the axes of the bowl and of the motors are located in a common horizontal plane.

6. A decanter centrifuge as claimed in claim 3, wherein the drive means comprises one motor located below the bowl and secured to a support plate freely pivotable about a horizontal axis, and a belt drive connecting the motor pulley with a pulley secured to the bowl.

7. A decanter centrifuge as claimed in claim 3, wherein the drive means comprises one motor and a first pre-tensioned belt driving connecting the motor pulley with a pulley secured to the bowl, and the differential drive means comprises an epicyclic gear operatively connecting the bowl and the conveyor screw and having an input sunwheel shaft, an idler pulley supported for rotation about an axis parallel to the bowl axis by external bearing means located opposite the motor, a second pre-tensioned belt drive connecting the idler pulley with a pulley secured to the bowl, and a third belt drive connecting the idler pulley with the input sunwheel shaft.

* * * * *